May 7, 1929.  J. CIPKO  1,712,135

CONVERTIBLE SHOVEL BRUSH

Filed April 18, 1928

INVENTOR.
Joseph Cipko
BY
ATTORNEY

Patented May 7, 1929.

1,712,135

UNITED STATES PATENT OFFICE.

JOSEPH CIPKO, OF NEW YORK, N. Y.

CONVERTIBLE SHOVEL BRUSH.

Application filed April 18, 1928. Serial No. 270,852.

This invention relates to a convertible shovel and scraper especially adaptable for cleaning sinks and has for one of its objects the provision of a device having one extremity adapted to be used as a shovel and the other extremity adapted to be used as a scraper.

Another object of my invention is the provision of a device of the class described comprising a pivotally attached handle and means for holding the same in a predetermined position at one end of the device for permitting employment of the opposite extremity thereof and means for holding the handle in extended relation from the last mentioned extremity to facilitate employment of the first mentioned extremity.

A further object of my invention is the provision of a device of the class described comprising a pan member and a detachable scraper adapted to be employed while attached to said pan member and to be separated therefrom and employed for brushing dust into said pan member.

Other objects will appear hereinafter, the novel features and combinations being more clearly set forth in the appended claims.

In the drawings.

Figure 1:
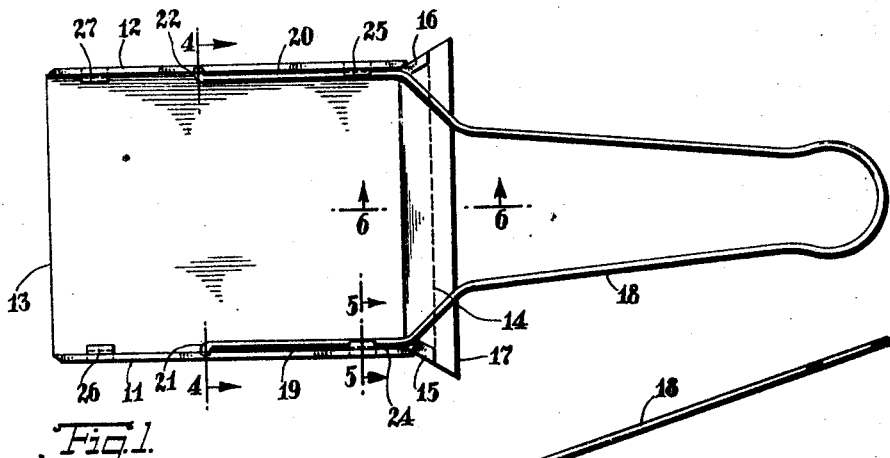
Fig. 1 is a top plan view of my invention.

Referring particularly to the drawings, the numeral 10 designates a body or pan preferably comprising rigid sheet metal. The body is formed with a flat bottom 10 and upright sides 11 and 12. The forward end 13 of the body as viewed in Fig. 1 is open and the rear end of the body is provided with an outwardly inclined flange 14. The extremities of the flange 14 are disposed forwardly and inwardly, as viewed in Fig. 1 for providing sockets 15 and 16 for receiving the extremities of a scraper member 17 which preferably comprises flexible material such as rubber.

Figure 2:
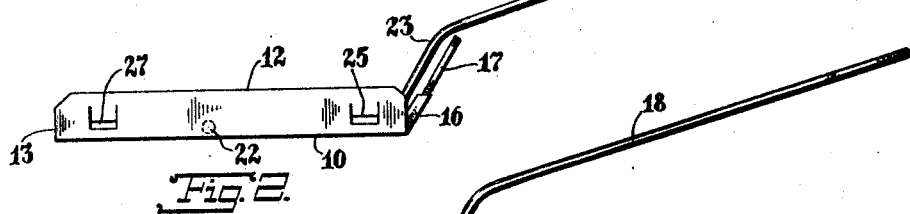
Fig. 2 is an elevational side view of my invention.
Figure 3:
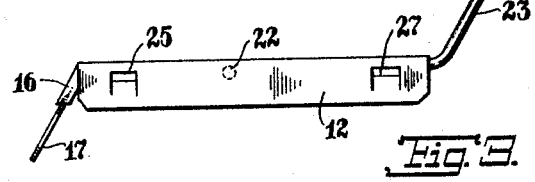
Fig. 3 is an elevational side view of my invention illustrating the same in inverted position.

A handle 18 preferably comprising wire is pivotally attached to the intermediate portion of the sides 11 and 12. The wire handle 18 comprises a U-shaped outer portion and substantially straight end sections 19 and 20. These end sections terminate in outwardly disposed extremities 21 and 22 respectively which are journaled in apertures in the sides 11 and 12 respectively. It should be understood that the above described construction permits the handle 18 to be rotated so as to extend from the rear end as shown in Fig. 1 or from the front end as shown in Fig. 3. The intermediate portions 23 of the handle 18 are offset as shown in Fig. 2 so as to clear the scraper member 17 when the handle is extended from the rear end of the device.

Figure 5:
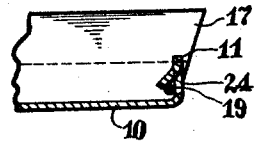
Fig. 5 is a fragmentary sectional view taken on the line 5—5 of Fig. 1.
Figure 4:
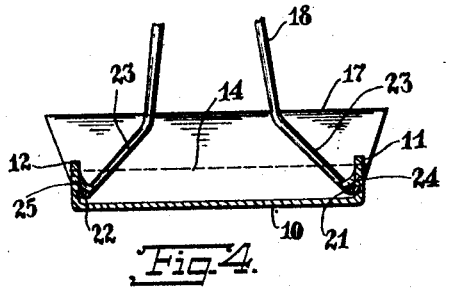
Fig. 4 is a transverse sectional view taken on the line 4—4 of Fig. 1.

Cut-out portions 24 and 25 formed in the rear end portions of the sides 11 and 12 serve to releasably hold the handle 18 in its rearward position and cut-out portions 26 and 27 formed in the front portion of the sides 11 and 12 respectively serve to releasably hold the handle 18 in its forward position. These cut-out portions comprise inwardly disposed flanges integral at their upper extremities with the respective sides of the body as shown in Fig. 5.

When the handle 18 is positioned as shown in Fig. 1, the device may be used as a shovel. The straight sections 19 and 20 of the handle may be released from engagement beneath the flanges 24 and 25 by pressing the sides of the handle together and may then be rotated to the position shown in Fig. 3 in engagement with the flanges 26 and 27. It should be understood that the handle 18 is sufficiently resilient to permit the disengagement of the straight sections thereof from the flanges and that the same may be engaged beneath the flanges by merely pressing the handle downwardly.

When the handle 18 is in the position shown in Fig. 3, the device can be inverted and used as a scraper and when it is desired to scrape or push dust and dirt into the pan the scraper element 17 may be removed from its sockets for this purpose.

Figure 7:
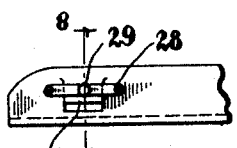
Fig. 7 is a fragmentary side elevational view of a modification of my invention.
Figure 6:
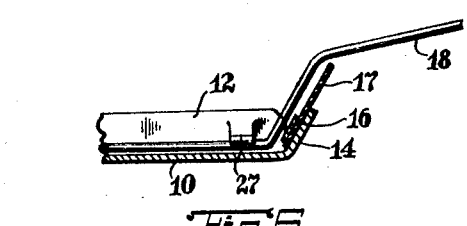
Fig. 6 is a fragmentary longitudinal sectional view taken on the line 6—6 of Fig. 1.
Figure 8:
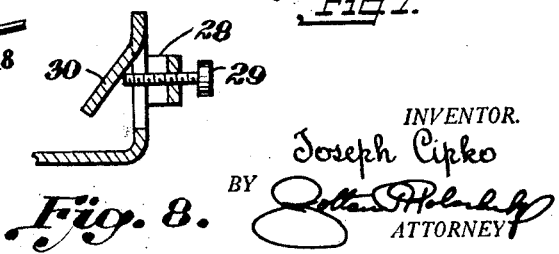
Fig. 8 is an enlarged sectional view, taken on the line 8—8 of Fig. 7.

In the modified form of my invention shown in Fig. 7 a cleat 28 is mounted on the outer side of the body over the opening therein. A bolt 29 is threaded in the cleat 28 and extends inwardly against the cut-out flange 30 for retaining the same in a predetermined inwardly disposed position so as to lock the handle 18 against being moved out of its position. It is pointed out that the flange 30 must be manually pressed outwards before the handle 18 may be moved, and the bolt 29 prevents such motion of the flange 30.

Obviously those skilled in the art may make various changes in the details and arrangement of parts of my invention without departing from the spirit and scope thereof.

Having thus described my invention what I claim as new and desire to secure by United States Letters Patent is:

1. A device of the class described comprising, a body portion, a flange on one end of said body portion, a scraper removably attached to said flange, the opposite end of said body portion being open, a handle comprising a U-shaped portion and straight end portions having outwardly disposed extremities journaled in apertures in the sides of said body portion, and inwardly disposed flanges integral with said sides at the opposite end portions thereof adapted to engage the straight portions of said handle for releasably holding the same in predetermined positions to facilitate selective employment of the open end of said body as a shovel and use of the scraper of the opposite end of said body.

2. A device of the class described comprising a pan member having upright sides, an inclined flange on one end of said pan member, the other end thereof being open, sockets on the extremities of said flange comprising forwardly and inwardly disposed flanges, a scraper removably mounted in said sockets, a handle comprising a bail having end projections journaled in apertures in the sides of said pan adapted to be positioned at either end of said pan for permitting employment of one end as a shovel and the other as a scraper, inwardly disposed flanges integral with the sides of said pan formed by cut-out portions thereof, cleats secured to the outer surface of said sides, and a bolt screw threaded in an aperture in each of said cleats engageable with one of said flanges for holding the same in an inwardly disposed position.

3. A device of the class described comprising, a body portion, a flange on one end of said body portion, a scraper removably attached to said flange, the opposite end of said body portion being open, a handle comprising a U-shaped portion and straight end portions having outwardly disposed extremities journaled in apertures in the sides of said body portion, and flanges projecting from the said sides and arranged for engaging the straight portions of said handle for releasably holding the same in predetermined positions to facilitate selective employment of the open end of said body as a shovel and use of the scraper of the opposite end of said body.

4. A device of the class described, comprising a pan member having upright sides, an inclined flange on one end of said pan member, the other end thereof being open, sockets on the extremities of said flange comprising forwardly and inwardly disposed flanges, a scraper removably mounted in said sockets, a handle comprising a bail having end projections journaled in apertures in the sides of said pan adapted to be positioned at either end of said pan for permitting employment of one end as a shovel and the other as a scraper, inwardly disposed flanges integral with the sides of said pan formed by cut-out portions thereof, and a means for holding these flanges in inwardly disposed positions.

In testimony whereof I have affixed my signature.

JOSEPH CIPKO.